United States Patent [19]
Paoli

[11] Patent Number: 5,574,491
[45] Date of Patent: Nov. 12, 1996

[54] APPARATUS SPOT POSITION CONTROL IN AN OUTPUT DEVICE EMPLOYING A LINEAR ARRAY OF LIGHT SOURCES

[75] Inventor: Thomas L. Paoli, Los Altos, Calif.

[73] Assignee: Xerox Corporation, Stamford, Conn.

[21] Appl. No.: 195,600

[22] Filed: Feb. 14, 1994

Related U.S. Application Data

[63] Continuation of Ser. No. 812,248, Dec. 20, 1991.

[51] Int. Cl.⁶ .................................................. B41J 2/435
[52] U.S. Cl. ............................................ 347/248; 347/234
[58] Field of Search ............................... 346/107 R, 108;
372/24; 359/204; 250/578.1; 347/234, 248,
225, 224, 133, 130, 129, 258, 259, 243,
241, 239, 238

[56]  References Cited

U.S. PATENT DOCUMENTS

| | | | |
|---|---|---|---|
| 4,040,096 | 8/1977 | Starkweather | 358/302 |
| 4,229,750 | 10/1980 | Kawamura et al. | 347/243 |
| 4,445,125 | 4/1984 | Scifres et al. | 346/108 |
| 4,536,778 | 8/1985 | De Schamphelaere et al. | 346/107 R X |
| 4,600,837 | 7/1986 | DiStefano et al. | 250/235 |
| 4,651,169 | 3/1987 | Muka | 346/108 |
| 4,651,170 | 3/1987 | Chandler et al. | 346/108 |
| 4,802,182 | 1/1989 | Thornton et al. | 372/50 |
| 4,845,725 | 7/1989 | Welch et al. | 372/46 |
| 4,864,326 | 9/1989 | Kawamura et al. | 346/108 |
| 4,870,652 | 9/1989 | Thornton et al. | 372/50 |
| 5,049,897 | 9/1991 | Ng | 346/108 |
| 5,062,115 | 10/1991 | Thornton | 372/50 |
| 5,138,339 | 8/1992 | Curry et al. | 347/239 X |
| 5,225,851 | 7/1993 | Schoon | 346/108 |

FOREIGN PATENT DOCUMENTS 22-20018  9/1990  Japan .

OTHER PUBLICATIONS

Bestenreiner, F., U. Greis, J. Helmberger, and K. Stadler, *Visibility and Correction of Periodic Interference Structures in Line–by–Line Recorded Images*, Journal of Applied Photographic Engineering, 2:2, Spring 1976, pp. 86–92.

Filinski, I. and T. Skettrup, *Fast Dispersive Beam Deflectors and Modulators*, IEEE Journal of Quantum Electronics, QE–18:7, Jul. 1982, pp. 1059–1062.

Urbach, John C., Tibor S. Fisli, and Gary K. Starkweather, *Laser Scanning for Electronic Printing*, Proceedings of the IEEE, 70:6, Jun. 1982, pp. 597–618.

Sprague, Robert A., John C. Urbach, and Tibor S. Fisli, *Advances in Laser and E–O Printing Technology*, Laser Focus/Electro-Optics, Oct. 1983, pp. 101–109.

R. L. Thornton, et al., *Low Threshold Planar Buried Heterostructure Lasers Fabricated By Impurity–Induced Disordering*, App. Phys. Lett., vol. Y7, No. 12, 1986, pp. 1239–1241.

*Primary Examiner*—Benjamin R. Fuller
*Assistant Examiner*—David Yockey

[57] ABSTRACT

In a method and apparatus for raster scanning optical output device, such as a laser printer or the like, an array of independently addressable light emitting devices, such as an array of solid state lasers, is used to control spot position on an image plane in the slow scan direction. The array is disposed such that the spots emitted from each element of the array impinge the image plane displaced in the slow scan direction from one another. The total distance between all the spots is less than the distance between fast scan direction scan lines. Only a single element of the array is operated per scan line, thus only a single spot is formed on the image plane per scan line. Control of which of the elements of the array emits a light beam per scan line allows control of the spot position in the slow scan direction for that scan line.

10 Claims, 8 Drawing Sheets

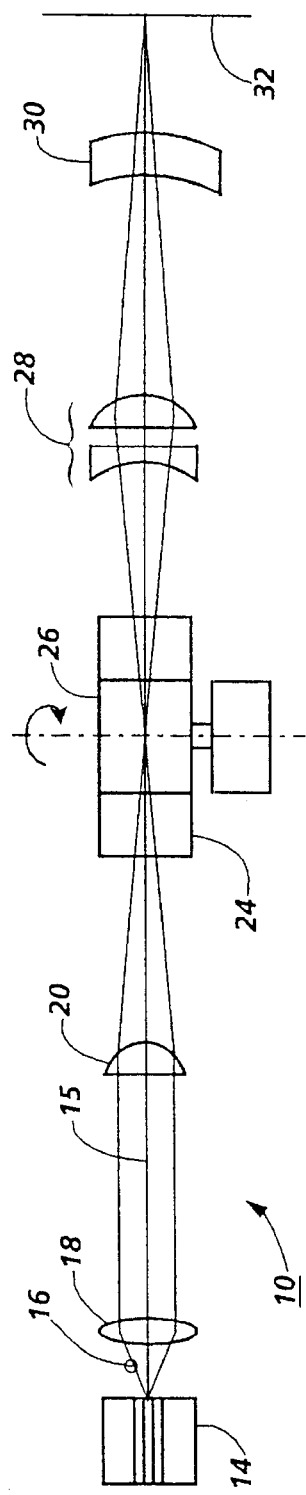
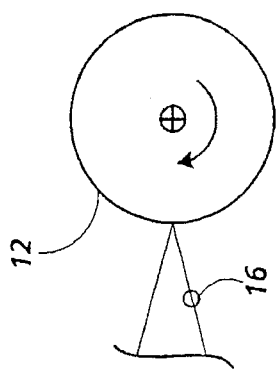
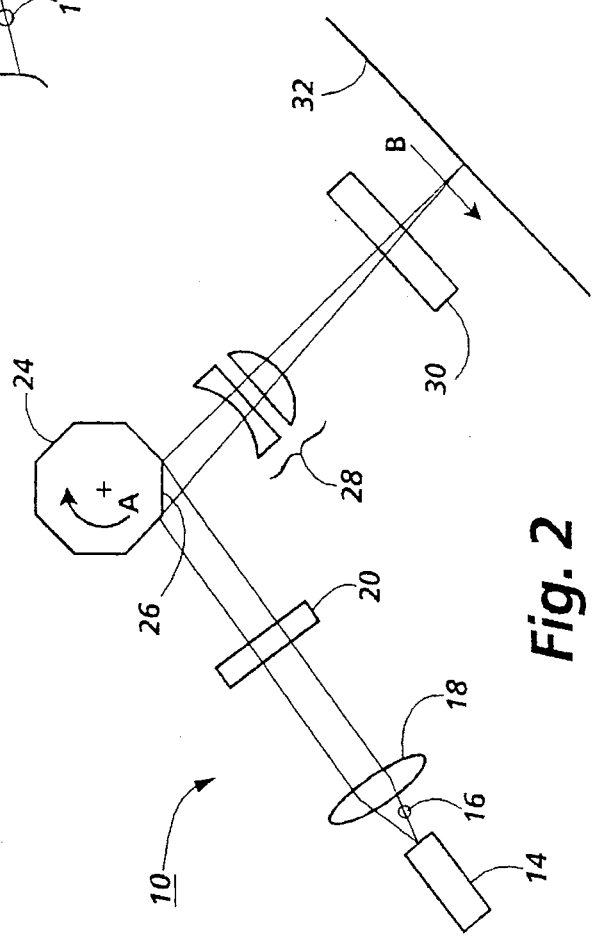
Fig. 1
Fig. 1A
Fig. 2

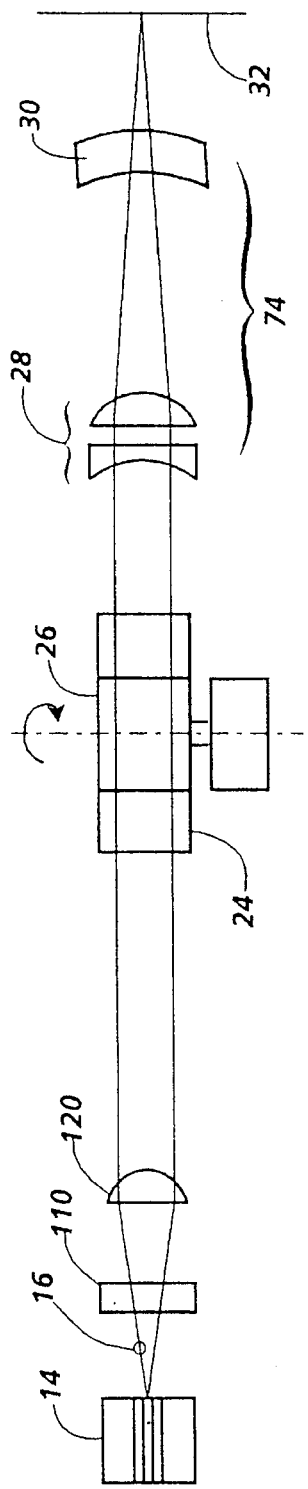
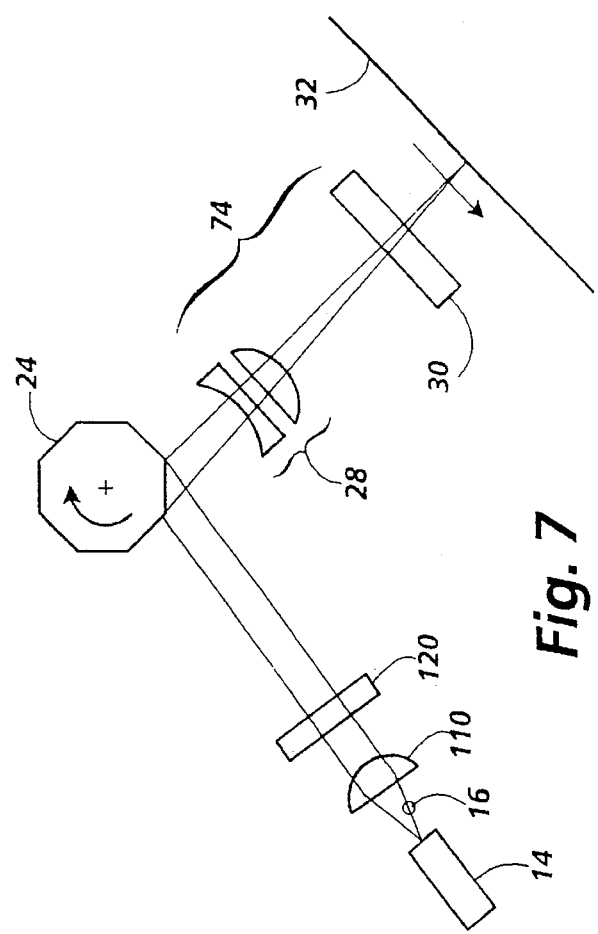
Fig. 6
Fig. 7

APPARATUS SPOT POSITION CONTROL IN AN OUTPUT DEVICE EMPLOYING A LINEAR ARRAY OF LIGHT SOURCES

This is a continuation of application Ser. No. 07/812,248, filed Dec. 20, 1991.

BACKGROUND OF THE INVENTION

The present invention relates generally to optical scanning devices, and more specifically to an apparatus for providing spot position control of a laser spot on a photoreceptive element in a raster output scanning system.

Although applicable to a wide variety of optical output devices, the present invention finds particular utility in Raster Output Scanning (ROS) apparatus. Therefore, the following details and descriptions begin with a background of the present invention in terms of ROS apparatus. ROS has become the predominant method for imparting modulated light information onto the photoreceptor in printing apparatus used, for example, in digital printing, and has found some application in other image forming operations such as writing to a display, to photographic film, etc. Consider, for illustration purposes, what is perhaps the most common application of ROS, digital printing. As is known, the scanning aspect thereof is conventionally carried out by a moving reflective surface, which is typically a multifaceted polygon with one or more facets being mirrors. The polygon is rotated about an axis while an intensity-modulated light beam, typically laser light, is brought to bear on the rotating polygon at a predetermined angle. The light beam is reflected by a facet and thereafter focussed to a "spot" on a photosensitive recording medium. The rotation of the polygon causes the spot to scan linearly across the photosensitive medium in a fast scan (i.e., line scan) direction. Meanwhile, the photosensitive medium is advanced relatively more slowly than the rate of the fast scan in a slow scan direction which is orthogonal to the fast scan direction. In this way, the beam scans the recording medium in a raster scanning pattern. (Although this discussion is in terms of ROS apparatus, by way of example, there exist many other scanning and non-scanning system embodiments of the present invention. As a convention, however, the word "scan" will be used when referring to fast and slow scan directions with the understanding that actual scanning of the spot is not absolutely required.) The light beam is intensity-modulated in accordance with a serial data stream at a rate such that individual picture elements ("pixels") of the image represented by the data stream are exposed on the photosensitive medium to form a latent image, which is then transferred to an appropriate image receiving medium such as sheet paper.

Data in each of the fast and slow scan directions is generally sampled. The sampling rate of the slow scan direction data equates to 300 lines per inch or more in many printing apparatus. It has been shown that errors in the slow scan direction of greater than 10% of the nominal line spacing may be perceived in a half tone or continuous tone image. This implies a need for a high degree of spot position control in the slow scan direction on the image plane, especially in such applications as multiple beam and multiple ROS color printers where control of the position of multiple spots is critical. Furthermore, high resolution printing, on the order of 600 spots per inch or higher demands very accurate spot positioning.

Errors in the spot position in the slow scan direction arise from many sources, including polygon and/or photosensitive medium motion flaws, facet and/or image plane (e.g., photosensitive medium) surface defects, etc. These errors are most commonly addressed by passive or active in-line optics. Positional errors which extend over an entire scan line are most commonly compensated for by retarding or advancing the start of scan or image plane position for that line (this correction being limited to whole multiples of a scan line spacing, thus requiring only passive in-line optical elements). See, for example, *Advances in Laser and E–O Printing Technology,* Sprague et al., Laser Focus/Electro-Optics, pp. 101–109, October 1983. Another approach employing passive optics is the use of extremely high quality optical and mechanical elements. This necessarily implies higher overall costs, and possible limitations on the durability of the system. Still another example of passive optical correction is the system disclosed in U.S. Pat. No. 4,040,096, issued Aug. 2, 1977 to Starkweather which accommodates a basic polygon ROS structure having runout and/or facet errors (both scanning errors in the slow scan direction) by locating a first cylindrical lens in the pre-polygon optical path, which focuses the beam in the slow scan direction onto the facet, and a second cylindrical lens in the post-polygon path, which focuses the facet onto the desired image plane. Toroidal elements and concave mirrors have also been used to accomplish the same function.

Active compensation for process scan direction errors usually involves a closed loop and/or memory-fed compensation system. A closed loop acousto-optical (A–O) compensation system is discussed in *Laser Scanning for Electronic Printing,* Urbach et al., Proceedings of the IEEE, vol. 70, No. 6, June 1982, page 612, and the reference cited therein. As discussed in this reference, a slow scan spot position detector is placed in the scan line which, together with related processing apparatus, is capable of quantifying the slow scan displacement. An A–O element is disposed in the optical path whose refractive index may be varied by establishing therein an acoustic wave. A variation in the acoustic wave generated in the A–O element is accompanied by a variation in the dispersion angle (that is, the angle of the output beam relative to the angle of the input beam). The slow scan displacement information from the detector and processing apparatus is fed to the acoustic wave generating portion of the A–O device, which may then control the slow scan direction position of the scan line in response to the displacement information. Further, the control information for certain recurrent displacement errors may be measured in advance and synchronized with the angular motion of the rotating polygon, as discussed in the above reference. See also *Visibility and Correction of Periodic Interference Structures In Line-by-Line Recorded Images,* J. Appl. Phot. Eng., vol. 2, pp. 86–92, Spring 1976.

Copending United States patent applications Ser. Nos. 07/747,166 and 07/747,889 disclose an apparatus and method of slow scan direction spot position control in which spot position control is achieved by interposing between the light source and photoreceptor an optical element which deflects incident light in the slow scan direction by an amount which depends on the wavelength of the incident light. Copending United States patent applications Ser. Nos. 07/747,039 and 07/747,176 disclose an apparatus and method of slow scan direction spot position control in which spot position control is achieved by interposing between the light source and photoreceptor an electro-optical element which deflects incident light in the slow scan direction by an amount which depends on the electrical voltage applied across it. In both cases, spot position control may be part of a feed back loop, or may be based on predetermined spot position requirements.

There is presently a need in the art for spot position control apparatus and methods which provide improved simplified, very high resolution deflection of an optical beam in the slow scan direction.

Shortcomings of spot position control schemes known in the art include the complexity, cost and/or the difficulty of manufacture of such systems. For example, the use of high quality optics requires not only high quality optical elements, but utmost control in the positioning of those optics, in order to obtain the requisite very precise mechanical control sufficient to adjust spot position 0.02 mm or less, required in many cases. In order to achieve this level of spot position control with the aforementioned acousto-optic modulators, an acoustic wave must be established and maintained with great precision. The acousto-optic modulators employed are relatively quite expensive, and require an associated accurate high frequency signal generator and related electronics to produce and maintain the acoustic waves.

Two further disadvantages of many prior art spot position control schemes are the speed and precision at which they are capable of operating. For example, three of the most common ROS schemes, cylinder lenses, rotating mirrors, and translating roof mirrors are generally too slow to correct for motion quality errors or line-to-line errors, while rotating mirrors and translating roof mirrors are also large and therefore difficult to move precisely and quickly.

SUMMARY OF THE INVENTION

The present invention provides a novel apparatus for controlling the spot position or registration in the slow scan direction in an optical output system which overcomes a number of problems and shortcomings of the prior art. Spot position refers to the location that a light beam is incident upon an image plane, and spot registration refers to the location that the light beam is incident on that imaging medium positioned at an image plane relative to other spot positions (for example in overwriting a spot for tone, position, color, or control of other parameters). However, for simplicity of explanation, any reference to control of spot position will include control of spot registration, unless otherwise noted. In general, the spot position control is enabled by using a linear array of closely spaced lasers for the light source. By activating only one laser in the array for each scan line and controlling which laser is activated, spot position control may be achieved. As is well understood, the illumination profile of each laser spot, upon the imaging medium is continuous.

One embodiment of the present invention is a raster output scanning apparatus which includes, inter alia, a light source composed of a linear array of closely spaced, individually addressed emitters, typically a monolithic array of solid state diode lasers, for emitting a light beam, means for selecting one laser, means for modulating the light beam in accordance with a data signal, means for scanning the light beam in a raster fashion, and image plane means (e.g., a photoreceptive element, display screen, photoreceptive film, etc.) for receiving the scanned light beam. Means for determining the existence and extent of spot position errors and/or the need for application of predetermined spot position correction may also be included.

In operation, a light beam is generated by the light source, which is modulated in response to an image data signal. The light beam is scanned across at least a portion of a surface of the image plane means in a fast scan direction, as well as scanned across at least a portion of a surface of the image plane means in a slow scan direction which is normal to the fast scan direction. The existence and extent of error, if any, in the position of the light beam in the slow scan direction is determined for a part or all of the scan in the fast scan direction. Correction for any slow scan direction error is performed by selecting and operating a single laser in the source array in response to the determination of the existence and extent of such error. Many of the problems and limitations of the prior art are thereby overcome.

The control of spot position on the image plane provided by the present invention may be employed to correct for inter-line slow scan direction positional errors by varying the laser selected from the array in response to the output of a means for detecting and quantifying such positional errors and/or in response to predetermined correction information output from a processor controlled memory unit or the like.

Furthermore, the maximum amount of slow scan direction spot position correction that will be required will be equal to one half of a scan line spacing. Any greater amount of correction may be realized through a combination of the above spot position control and retardation or advancement of one or more scan lines.

The scope of the present invention and the manner in which it addresses the problems associated with prior art methods and apparatus will become more readily apparent from the following detailed description when taken in conjunction with the accompanying drawings and claims.

BRIEF DESCRIPTION OF THE DRAWINGS

FIG. 1 shows a side or elevation view of the general optical configuration of an apparatus according to one embodiment of the present invention, showing a linear array of closely spaced diode lasers as the light source for a typical ROS system.

FIG. 1A shows a photoreceptive drum at the image plane of the apparatus of FIG. 1 as might typically be employed in a xerographic printing application of the present invention.

FIG. 2 shows a top or plan view of the general optical configuration of the apparatus of FIG. 1, showing a linear array of closely spaced diode lasers as the light source for a typical ROS system.

FIG. 6 shows a side or elevation view of the general optical configuration of an apparatus according to a second embodiment of the present invention, showing a linear array of closely spaced diode lasers as the light source for a typical ROS system.

FIG. 7 shows a top or plan view of the general optical configuration of the apparatus of FIG. 6, showing a linear array of closely spaced diode lasers as the light source for a typical ROS system.

In general, like reference numerals will be used to denote like elements as between each of the aforementioned figures.

DETAILED DESCRIPTION

Figure 3:
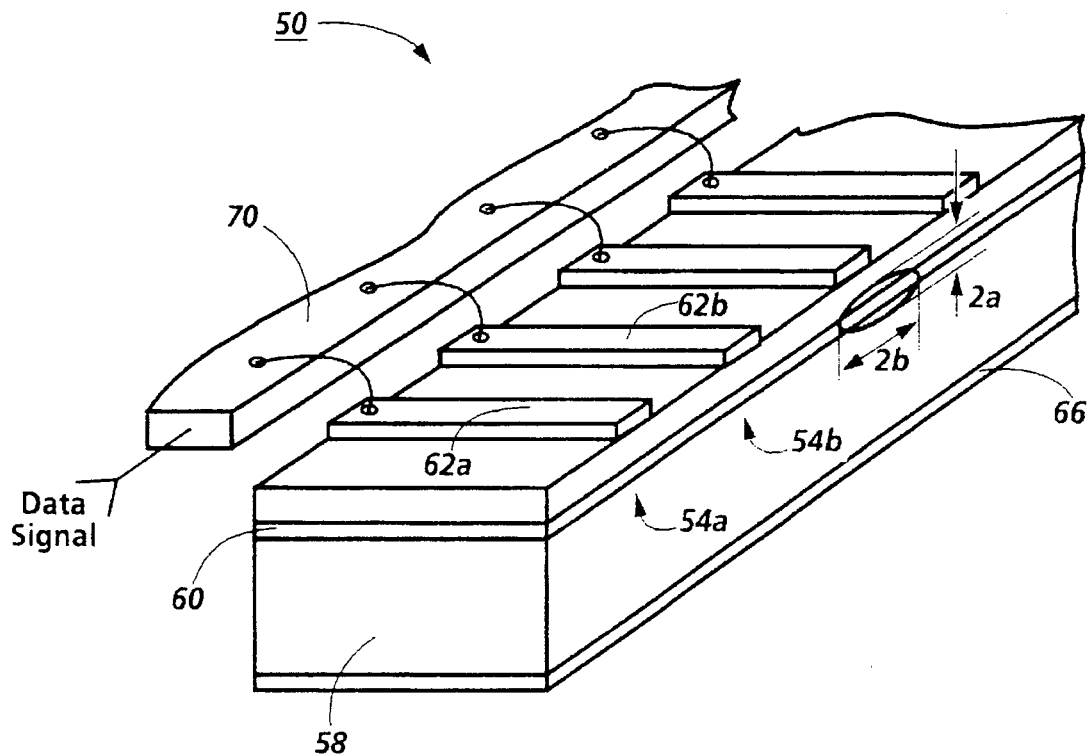
FIG. 3 shows one embodiment of a solid state laser capable of emitting from one of a number of selectable stripes, and connected to a switching unit capable of directing an input data signal to a selected laser.

A detailed description of a first embodiment of the present invention is presented herein with reference to FIGS. 1 and 2, which show, respectively, slow scan plane and fast scan plane views of a scanning apparatus 10. Apparatus 10 is a raster output scanning device of the type which may, for example, output a scanned modulated optical signal to a photoreceptive drum 12 or other suitable imaging medium, such as that shown in FIG. 1a, for use in a xerographic printing process. Alternatively, apparatus 10 may output a scanned modulated optical signal to a display device, a photographic device or other application employing such a scanned modulated optical signal.

Apparatus 10 includes a light source 14 which produces a diverging beam of coherent light 16, as described in further detail below. In the path of beam 16 are a spherical lens 18, which has power in both the fast and slow scan planes, cylindrical lens 20, which has power only in the slow scan plane, scanning device 24, which is shown as a rotating polygon having at least one reflective facet 26 (but which may also be a rotating hologram, rotating diffraction grating, etc.), compound spherical lens 28, and toroidal lens 30. The path of beam 16 terminates at image plane 32, which may be a line on the aforementioned rotating photoreceptive drum 12 (FIG. 1a) or imaging medium, such as, a surface of a ground glass or other type of display screen, a photosensitive film, etc. (not shown).

Spherical lens 18 serves to collimate the diverging beam 16 in the fast and slow scan planes. Cylindrical lens 20 serves to focus beam 16 in the slow scan plane onto facet 26 of scanning device 24. Since beam 16 is not focussed in the fast scan plane, it is impinges on facet 26 as a line which extends across the entire width of facet 26. Thus, facet 26 is fully illuminated in the fast scan plane, as shown in FIG. 2.

Beam 16 is reflected by facet 26 so as to pass through compound spherical lens 28. Since the beam converges on facet 26, upon reflection from facet 26 beam 16 diverges. Therefore, lenses 28 and 30 are employed to refocus the beam to a circular or elliptical cross-section onto image plane 32, and to correct for scan nonlinearity (f-theta correction). Toroidal lens 30, or an equivalent thereto (such as a cylindrical mirror) further corrects for wobble (scanner motion or facet errors) as known in the art.

Thus, if scanning device 24 rotates in a clockwise fashion, as shown by arrow A in FIG. 2, a beam reflected from one of its moving facets will be caused to scan across the image plane 32, as indicated by the arrow B. By modulating the beam, for example by modulating the current applied to the laser itself from below to above the lasing threshold, as known in the art, a scanned modulated single beam of general application results. If the image plane 32 comprises the line on the rotating photoreceptive drum 12 of FIG. 1a, and the rotation of drum 12 and the modulation and scanning of the beam are properly coordinated, a ROS printer device may be realized.

The embodiment shown in FIGS. 1 and 2 is only one embodiment of a laser scanning system known in the art. Other suitable optical systems are also well known to those skilled in the art. Furthermore, many of the details of the lenses and other optical and mechanical components of a complete ROS system may be omitted for clarity since they are well known in the art.

Figure 4:
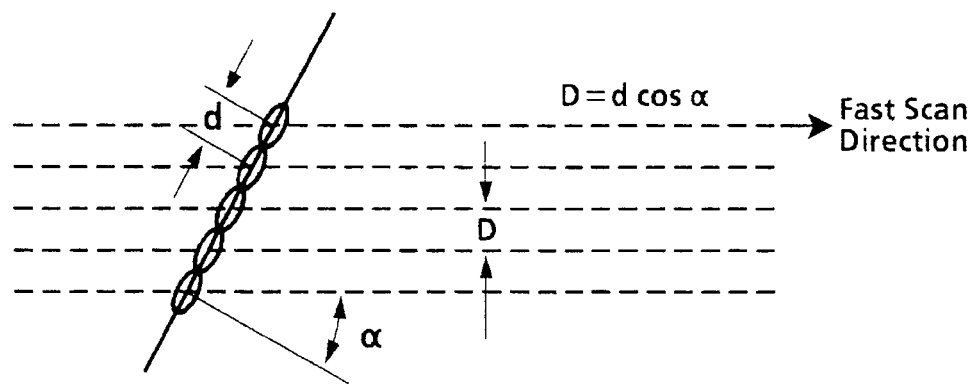
FIG. 4 shows a schematic representation of the possible positions of some of the emitted laser spots imaged on the photoreceptive surface during a single scan for the purposes of description.

The basis for spot position control according to this invention is a monolithic array of diode lasers which serve as the source for beam 16. With reference to FIG. 3, light source 14 comprises a monolithic array 50 of N linearly arranged closely spaced diode lasers 54a, 54b, etc., any one of which lasers can be individually selected to be used as the source of beam 16. Array 50 may be of the type shown in U.S. Pat. Nos. 4,870,652 or 4,445,125, which are incorporated herein by reference thereto. Although there are N diode lasers in the array, only one laser at a time is used for each scan produced by scanning device 24. To provide for increased spot control in the slow scan direction, the laser array may be inclined such that the image of each laser spot on the photoreceptor surface is oriented at an angle A with respect to the fast scan direction as shown in FIG. 4. Spot position control is achieved by selecting a single laser of array 50 for each scan to achieve the desired position of the spot on the photoreceptive surface.

Returning to FIG. 3, individual lasers 54a, 54b, etc. can be of the buried heterostructure type, each comprised of a substrate 58 upon which is epitaxially deposited a plurality of semiconductor layers generally designated by reference numeral 60 which provide for diode laser action and in which a linear array of individual diode lasers is formed, e.g. by the process of impurity induced disordering as described in U.S. Pat. No. 4,870,652 or by other techniques known to those skilled in the art. Each laser 54a, 54b, etc. in this array has a separate electrode 62a, 62b, etc. acting in conjunction with a substrate electrode 66 to provide the current drive signal to each laser separately, e.g. as described in U.S. Pat. No. 4,870,652 or by other techniques known to those skilled in the art. Current is applied to only one laser in the array during each scan line with selection accomplished by the switching unit 70 which switches the input current signal to the output line for the appropriate laser contact 62a, 62b, etc. in response to a selection signal to be described below. The current drive signal is a pulse modulation representation of the data to be printed, and drives the laser to provide an output light beam from any laser modulated in accordance with this information. The output beams are emitted from a common plane and may have a practical physical separation as low as 2 to 10 μm, to be described further below.

The overall range E of spot control is determined by the number N of lasers in the array and the effective distance D (FIG. 4) between the scans produced by each laser on the photoreceptive surface by the same facet of the scanning polygon as $$E = DN \qquad (1)$$

The range E is determined by the line spacing of the raster scanning while the effective distance D is set by the desired quality of the printing. The range E over which the spot must be place is at most ± one half of the line spacing. Any greater amount of correction may be realized through a combination of this amount of control and retardation or advancement of one or more scan lines. The effective distance D is determined by the accuracy A of spot placement required by the desired quality of the printing, since D is the minimum distance that the scan line can be shifted by moving from one laser to its adjacent neighbor in the array. As shown in FIG. 4

$$D = d \cos \alpha \quad (2)$$

where d is the distance between lasers in the array and α is the angle of inclination between the array and a line in the fast scan direction. Thus, the number of lasers in the array is equal to the line spacing divided by the accuracy. In other words, 1/N is the achievable placement accuracy expressed as a fraction of the line spacing.

For example, a system printing at 300 lines/inch in the slow scan direction requires spot control over a range of at most ±42.33 μm, which is ± one half of the line spacing. Any greater amount of correction may be realized through a combination of this amount of control and retardation or advancement of one or more scan lines. In other words, correction need only be made for the position of scan lines that randomly fall somewhere within ±42.33 μm of the desired position for a 300 lines/inch printer. A placement accuracy of 10% of the line spacing requires a printing system wherein registration error is no more than ±4.23 μm. To achieve this degree of spot control requires 42.33 μm/4.23 μm=10 lasers in the array with laser-to-laser spacing of 8.47 μm/cos α. If α=0°, the lasers must be on 8.47 μm centers which is straightforward to achieve with impurity induced disordering as described in U.S. Pat. No. 4,870,652 or other techniques known to those skilled in the art. If the required position accuracy is ±1.25 μm, E=±42.33 μm requires 34 lasers spaced by 2.5 μm/cos α. If α=0°, the lasers must be on 2.5 μm centers which approaches the limit of presently known fabrication techniques. The required laser-to-laser spacing can be increased to 5.0 μm by inclining the laser array at α=60°, determined by cos α=2.5 μm/5.0 μm, or to 10 μm by inclining the array by α=75.5°. The accuracy can be increased further to 1% of the line spacing by inclining an array of 100 lasers spaced by 5.0 μm by α=80.3°.

Figure 5:
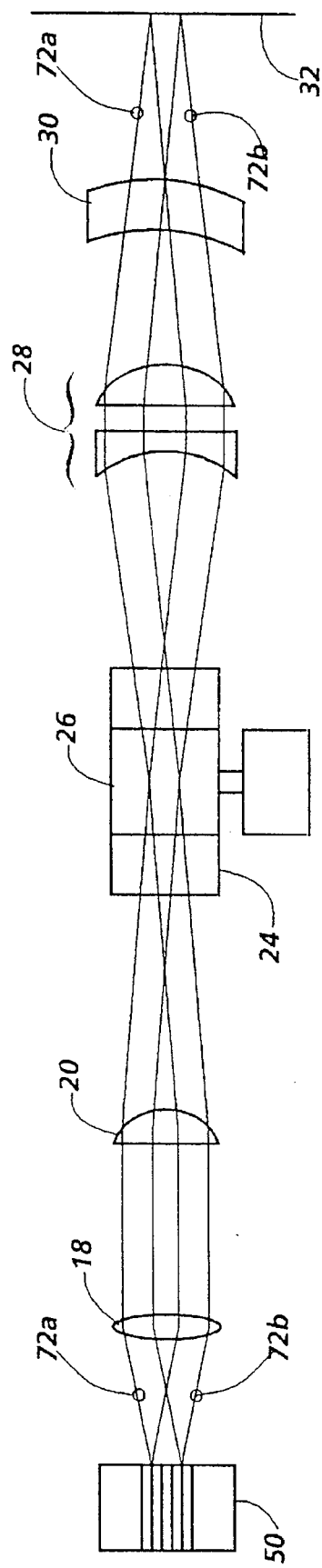
FIG. 5 is an illustration of the difference in spot position when two different lasers are selected for the embodiment shown in FIG. 1.

A requirement of this embodiment is that the overall magnification of the ROS optics is one (unity), so that the effective spacing between emitted spots is not increased at the photoreceptor surface. Since xerographic printers may require the spot size to be larger than the spot emitted by each laser in the array, the spot size in the slow-scan direction must then be enlarged independently of the optical magnification. One way to achieve this enlargement is to use the f-number of lens 28 in the ROS to control the spot size in the slow scan direction as well as in the fast scan direction. In this case, the minimum spot size of the diffraction limited lens is 1.06(F)(λ), where F is the f-number of the lens and λ is the wavelength of the light. It should be noted that although the imaging optics can not resolve the separation between lasers in the array, the center of the imaged spot on the photoreceptor will nevertheless move in the slow-scan direction by the effective laser-to-laser spacing when the array 50 is switched from one laser (e.g., 54a) to an adjacent neighbor (e.g., 54b). The difference in spot position when two different lasers are selected is illustrated in FIG. 5 for the embodiment shown in FIG. 1. In FIG. 5, beams 72a and 72b may be emitted from array 50, and although for illustration purposes two beams are shown in the figure, it will be understood by one skilled in the art that only a single beam will be emitted per scan line. The emission of one or the other of the beams will vary the position of the spot on the image plane 32 as shown.

FIGS. 6 and 7 show another embodiment of the ROS optics wherein the f-number of the post-polygon optics 74 is used to enlarge the spot size in both the slow-scan and fast-scan directions. In this case, first cylindrical lens 110 is used to collimate the optical beam in the fast scan direction and second cylindrical lens 120 is used to collimate the optical beam in the slow-scan direction. The focal lengths and positions of lenses 110 and 120 are chosen such that the aperture of the post-polygon optics is filled appropriately to produce a focused spot of size determined by the f-number of the post-polygon optics.

Another embodiment of this invention (not shown) employs the prepolygon optics to magnify both the effective laser-to-laser spacing and the spot size in the slow-scan direction. This approach requires ROS optics capable of forming a magnified image of the slow-scan spot emitted by each laser in the array. For this embodiment the ROS optics is similar to FIGS. 1 and 2 wherein the lenses 18 and 20 provided the required degree of magnification in the slow scan direction.

As an example, we consider a printing system wherein the optical intensity profiles used to scan adjacent lines must overlap such that the full width at half maximum (FWH M) of the intensity profile of each spot is equal to the spacing between lines. From equation (2), D=d cos α. If D is defined as the "accuracy," the "fractional accuracy" of the spot position control, K, can be written as $$K = \text{accuracy/line spacing} = [M(d \cos \alpha)]/[(M)(2S)] = [d \cos \alpha]/(2S) \quad (3)$$

where M is the optical magnification in the slow scan direction, and 2S is the spot size emitted by the laser in the slow scan direction. The ratio of accuracy to line spacing is independent of the optical magnification in the slow-scan direction because both the effective distance and the spot size are simultaneously magnified by the optics. In the fast scan direction the spot size can be determined by the size of the polygon facet or by the f-number of the post-polygon optics in the fast-scan direction.

Figure 8:
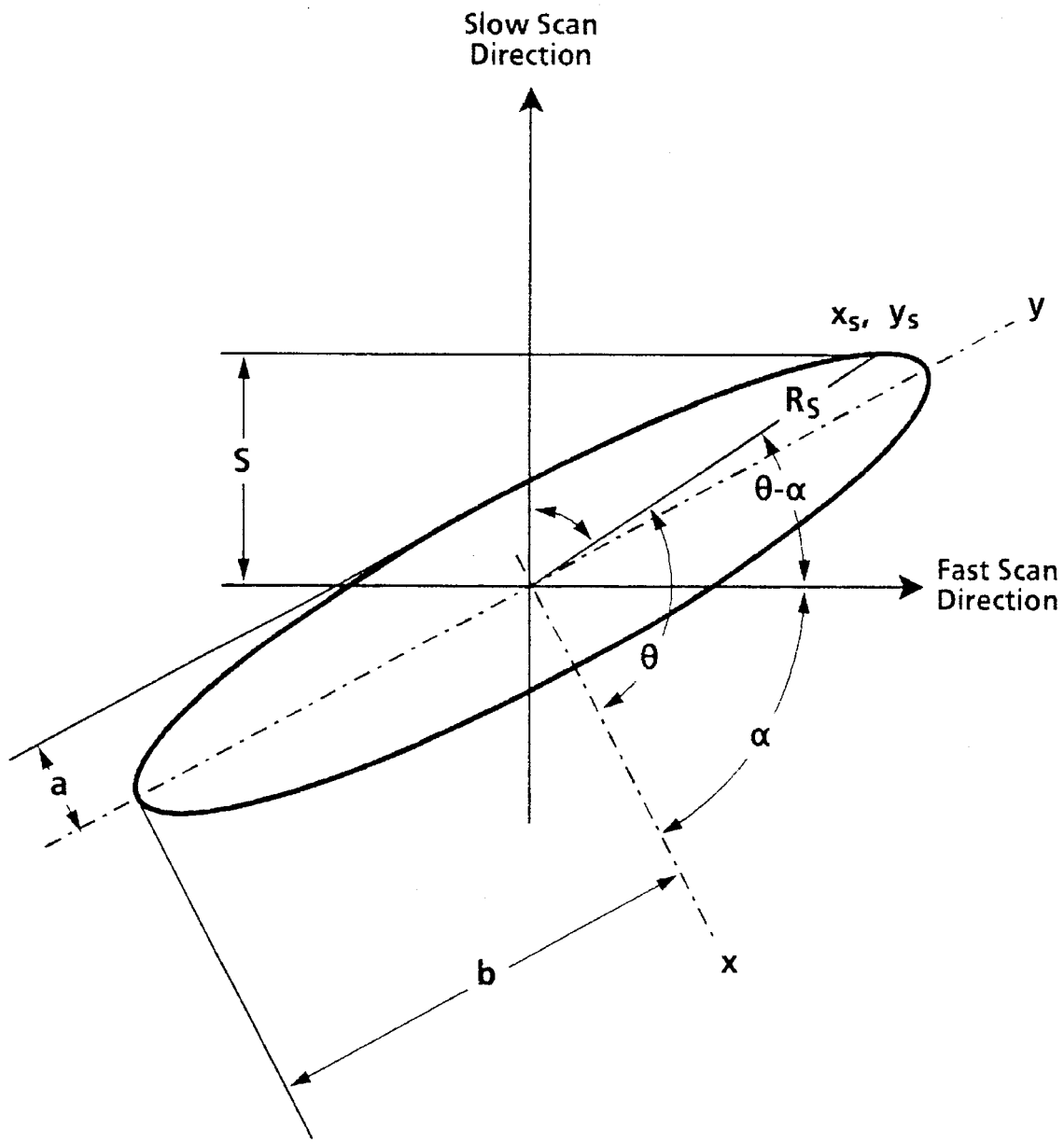
FIG. 8 shows the contours of the intensity distribution at half maximum value for one laser spot at the laser's emitting plane for the purposes of description.

When the laser array 50 is inclined to the fast-scan direction as shown in FIG. 4, the effective spot size in the slow scan direction is modified due to rotation of the elliptical intensity distribution emitted by each laser. For example, FIG. 8 illustrates the elliptical contour of the FWHM of the intensity profile emitted at the laser mirror with major axis=2b and minor axis=2a rotated by angle α with respect to a line in the fast-scan direction. The effective spot size in the slow-scan direction, 2S, is given by $$2S = 2(y_s \cos \alpha + x_s \sin \alpha) \quad (4)$$

where $(x_s, y_s)$ are the coordinates of the point on the ellipse which defines 2S. The point $(x_s, y_s)$ is determined from $$x_s^2 = a^2/[1 + (b/a)^2 \cot^2 \alpha] \quad (5)$$

and $$y_s^2 = b^2/[1 + (a/b)^2 \tan^2 \alpha] \quad (6)$$

Diode laser arrays composed of low threshold lasers, e.g. of the buried heterostructure type, have typically been designed to provide nearly complete confinement of the guided lightwave to the active region of the laser. Consequently the minor axis (2a in FIG. 3) of the FWHM ellipse is normally 1 to 2 μm, while the major axis of the FWHM ellipse (2b in FIG. 3) is normally 2 to 3 μm. The width of the minor axis is determined by the waveguiding layers of the epitaxial layer structure while the width of the major axis is determined by the lateral fabrication process, e.g. see, R. L. Thornton, et al., "Low Threshold Planar Buried Heterostructure Lasers Fabricated By Impurity-Induced Disordering", App. Phys. Lett., vol. 47, no. 12, page 1239–1241, (1986). Normally b is wider than a, but in some special structures b can equal a, e.g. see copending application Ser. No. 07/620,229 (attorney docket no. D/90302), which is incorporated by reference thereto.

Figure 9:
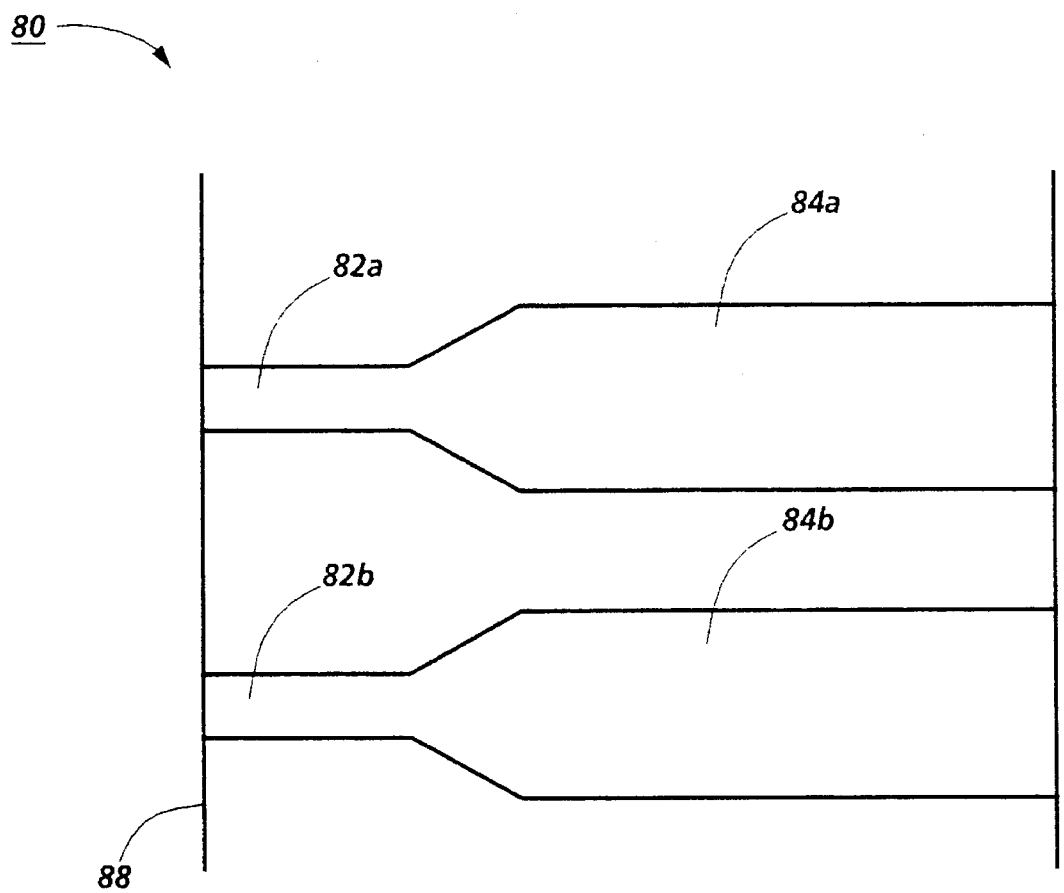
FIG. 9 shows the top or plan view of one embodiment of a solid state laser array used to obtain a wide spot along the active layer of the laser structure.

In order to satisfy all the requirements of the optical system of the printer, it is useful to have a laser with values of a and b selected for the system. For standard laser designs, increasing the thickness or width of the laser's active region leads to unwanted spatial modes. Thus, it is another aim of this invention to provide a laser array structure which allows the major and/or minor axes of the FWHM intensity profile of each output beam to be selected independently of the spacing between individual lasers in the array for use in the printing apparatus of this invention. Referring to FIG. 9, this goal is accomplished by array structure 80, wherein the output light beam is emitted at the laser facet 88 through narrow output waveguides 82a, 82b, etc. which are transparent to the light generated in active regions 84a, 84b, etc. The width of output waveguides 82a, 82b, etc. is less than the critical width required for complete confinement of the transmitted light. Consequently, by decreasing the width of each output waveguide, the output beamwidth 2b of each laser is increased independently of the laser-to-laser spacing in the array to a value appropriate for the printing system. Output waveguides of this type may be of the type shown in U.S. Pat. No. 4,802,182 which is incorporated herein by reference thereto. To some extent, a similar widening of the beam size can be accomplished for the minor axis of the FWHM ellipse by partially disordering the active region near the mirror, as described in U.S. Pat. No. 4,845,725, which is also incorporated herein by reference thereto.

Examples of suitable combinations of laser spot size, laser-to-laser spacing in the array, and optical magnification in high resolution printing systems are given in Tables I and II for a positioning accuracy of 10% of the line spacing, i.e. K=0.1. The inclination angle α is, in general, determined by inclining the array to satisfy equation (3) for each value of laser spacing d, i.e. cos α2S/10d. For the limiting case of a circular laser spot where a=b, the effective spot size 2S is equal to 2b independent of the angle of inclination. Consequently, the angle of inclination is set by d. The optical magnification required in the slow-scan direction, given by line spacing divided by 2S, is also independent of the angle of inclination. Suitable combinations of the line spacing, laser spacing, inclination angle, and optical magnification are illustrated in Table I for a diode laser ROS with a circular beam.

TABLE I

| Line Density/ Line Spacing | d | α for position control = 0.1 line spacing | 2b (2a = 2 μm) | Effective slow-scan spot size on laser = 2S | Optical magnification in slow-scan direction |
| --- | --- | --- | --- | --- | --- |
| 300 lpi/84.7 μm | 3 μm | 86.18 | 2 μm | 2 μm | 42.4 |
|  | 4 μm | 87.13 | 2 μm | 2 μm | 42.4 |
|  | 5 μm | 87.71 | 2 μm | 2 μm | 42.4 |
|  | 10 μm | 88.85 | 2 μm | 2 μm | 42.4 |
| 600 lpi/42.3 μm | 3 μm | 86.18 | 2 μm | 2 μm | 21.2 |
|  | 4 μm | 87.13 | 2 μm | 2 μm | 21.2 |
|  | 5 μm | 87.71 | 2 μm | 2 μm | 21.2 |
|  | 10 μm | 88.85 | 2 μm | 2 μm | 21.2 |
| 1000 lpi/25.2 μm | 3 μm | 86.18 | 2 μm | 2 μm | 12.6 |
|  | 4 μm | 87.13 | 2 μm | 2 μm | 12.6 |
|  | 5 μm | 87.71 | 2 μm | 2 μm | 12.6 |
|  | 10 μm | 88.85 | 2 μm | 2 μm | 12.6 |
| 1200 lpi/21.15 μm | 3 μm | 86.18 | 2 μm | 2 μm | 10.6 |
|  | 4 μm | 87.13 | 2 μm | 2 μm | 10.6 |
|  | 5 μm | 87.71 | 2 μm | 2 μm | 10.6 |
|  | 10 μm | 88.85 | 2 μm | 2 μm | 10.6 |

For an elliptical laser spot, rotation of the laser array changes the effective size of the spot in the slow scan direction. In this case the inclination angle α is selected by simultaneously satisfying equations (3), (4), (5), and (6). The optical magnification in the slow scan direction, given by the line spacing divided by 2S, is then determined for each line spacing, with the laser spot size calculated from equations (4), (5), and (6). Various selected parameters for this embodiment are summarized in Table II. Table II shows that it is possible to position the line scan to at least 0.1 of the line spacing for line densities from 300 to at least 1200 lines/inch. Other embodiments are obvious to those skilled in the art.

TABLE II

| Line Density/<br>Line Spacing | d | α for position<br>control = 0.1<br>line spacing | 2b<br>(2a = 2 μm) | Effective slow-<br>scan spot size<br>on laser = 2S | Optical<br>magnification<br>in slow-scan<br>direction |
|---|---|---|---|---|---|
| 300 lpi/84.7 μm | 3 μm | 86.1 | 6 μm | 2.03600 μm | 41.6 |
|  |  | 83.0 | 25.2 μm | 3.65682 μm | 23.2 |
|  | 4 μm | 87.1 | 6 μm | 2.02038 μm | 41.9 |
|  |  | 85.7 | 30 μm | 3.00618 μm | 28.2 |
|  | 5 μm | 87.7 | 6 μm | 2.01284 μm | 42.1 |
|  |  | 87.1 | 30 μm | 2.50680 μm | 33.8 |
|  | 10 μm | 88.85 | 6 μm | 2.00322 μm | 42.3 |
| 600 lpi/42.3 μm | 3 μm | 86.1 | 6 μm | 2.03600 μm | 20.8 |
|  |  | 84.9 | 20 μm | 2.67006 μm | 15.8 |
|  | 4 μm | 87.1 | 6 μm | 2.02038 μm | 20.9 |
|  |  | 85.7 | 30 μm | 3.00618 μm | 14.1 |
|  | 5 μm | 87.7 | 6 μm | 2.01284 μm | 21.0 |
|  |  | 87.1 | 30 μm | 2.50680 μm | 16.9 |
|  | 10 μm | 88.85 | 6 μm | 2.00322 μm | 21.1 |
| 1000 lpi/25.2 μm | 3 μm | 86.1 | 6 μm | 2.03600 μm | 12.4 |
|  |  | 84.9 | 20 μm | 2.67006 μm | 9.4 |
|  |  | 83.0 | 25.2 μm | 3.65682 μm | 6.9 |
|  | 4 μm | 87.1 | 6 μm | 2.02038 μm | 12.5 |
|  |  | 86.7 | 20 μm | 2.30482 μm | 10.9 |
|  |  | 85.7 | 30 μm | 3.00618 μm | 8.4 |
|  | 5 μm | 87.7 | 6 μm | 2.01284 μm | 12.5 |
|  |  | 87.1 | 30 μm | 2.50680 μm | 10.1 |
|  | 10 μm | 88.85 | 6 μm | 2.00322 μm | 12.6 |
| 1200 lpi/21.15 μm | 3 μm | 86.1 | 6 μm | 2.03600 μm | 10.4 |
|  |  | 84.9 | 20 μm | 2.67006 μm. | 7.9 |
|  |  | 83.0 | 25.2 μm | 3.65682 μm | 5.8 |
|  | 4 μm | 87.1 | 6 μm | 2.02038 μm | 10.5 |
|  |  | 85.7 | 30 μm | 3.00618 μm | 7.0 |
|  | 5 μm | 87.7 | 6 μm | 2.01284 μm | 10.5 |
|  |  | 87.1 | 30 μm | 2.50680 μm | 8.4 |
|  | 10 μm | 88.85 | 6 μm | 2.00322 μm | 10.6 |

A special case of this invention occurs when the ratio of the laser spacing d to the spot size 2b is equal to the fractional accuracy K. For this condition, equation (3) is satisfied for α=0 and no inclination of the array is required. To achieve this condition, the width of each laser spot is enlarged using the array structure 80, shown in FIG. 9 wherein the output light beam is emitted through narrow output waveguides 82a, 82b, etc. which are transparent to the light generated in active regions 84a, 84b, etc. The width of output waveguides 82a, 82b, etc. is less than the critical width required for complete confinement of the transmitted light. Consequently, by decreasing the width of each output waveguide, the output beam of each laser is widened independently of the laser-to-laser spacing in the array to a value which is 1/K times the laser-to-laser spacing. Output waveguides of this type may be of the type shown in U.S. Pat. No. 4,802,182 which is incorporated herein by reference thereto. Combinations of laser spot size, laser-to-laser spacing, and optical magnification suitable for this embodiment of a high resolution printing system are given in Table III for a positioning accuracy of 0.1.

Described above are embodiments employing two distinct methods of controlling the formation of the imaged spot on the image plane, namely enlargement of the slow-scan spot size using the f-number of the post-polygon optics, and simultaneous magnification of the effective slow-scan spot size and the effective laser-to-laser spacing. Other enlargement schemes may, however, be employed without departing from the spirit and scope of the present invention.

Figure 10:
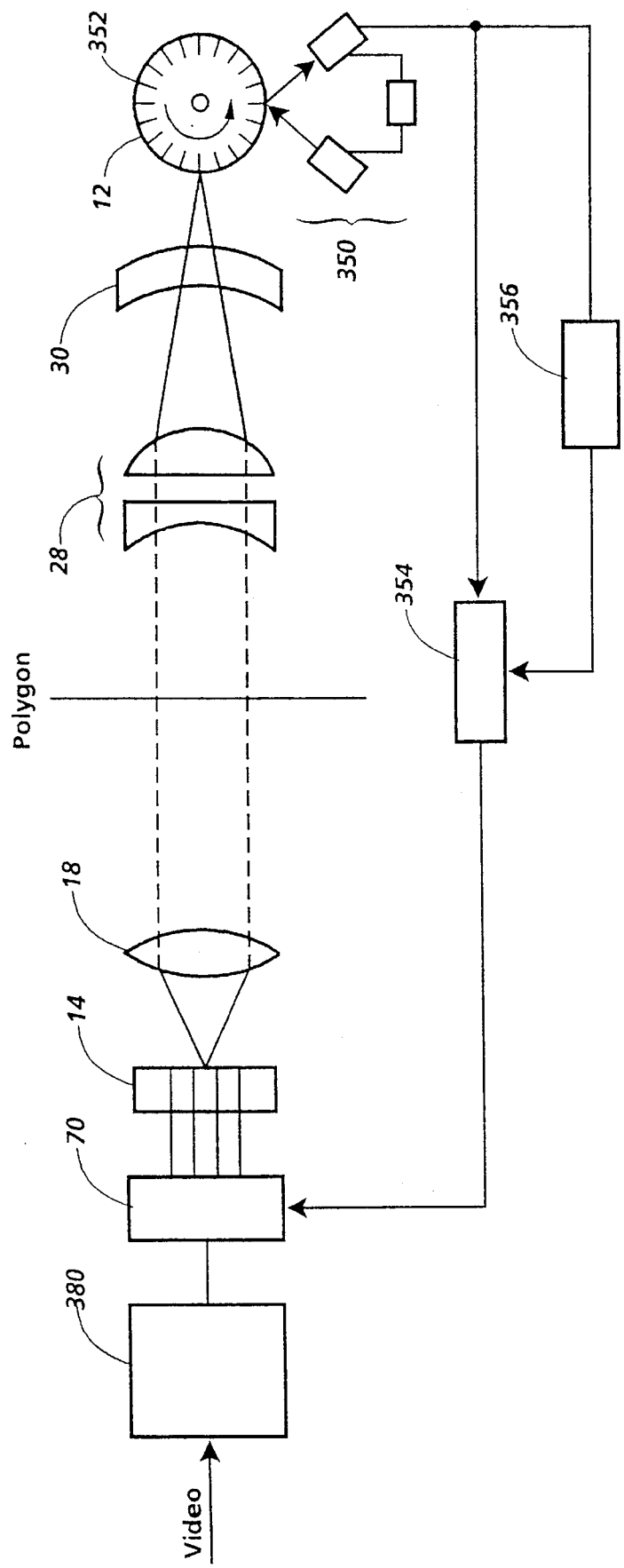
FIG. 10 shows a simplified version of a side or elevation view of the general optical configuration of an apparatus such as that described as the first embodiment of the present invention, further including means for detecting errors in the position of a photoreceptive drum and for feeding a measure of the error back to the switching element as a control signal for adjusting the position of the laser spot on the photoreceptive drum.

The method of the present invention may utilize either feedback control or control from stored data, or both, to move the spot in the slow-scan direction to accommodate for motion quality errors, and the like. In the case of feedback control, method and apparatus known in the art would be employed to determine the actual spot position, the desired spot position, and any difference therebetween, and to generate from a knowledge of that difference the proper control signals for effecting the wavelength adjustment resulting in the desired spot positioning. For example, the arrangement of FIG. 10 shows a simple method for determining the rotational error of a photoreceptive drum 12 by way of a synchronized strobe and sensor arrangement 350

TABLE III

| Line Resolution/<br>Raster Spacing | d | α for position<br>control = 0.1<br>line spacing | 2b<br>(2a = 2 μm) | Effective slow-<br>scan spot size<br>on laser = 2S | Optical<br>magnification<br>in slow-scan<br>direction |
|---|---|---|---|---|---|
| 300 lpi/84.7 μm | 3 μm | 0 | 30 μm | 30 μm | 2.8 |
| 600 lpi/42.3 μm | 3 μm | 0 | 30 μm | 30 μm | 1.4 |
| 1000 lpi/25.2 μm | 2 μm | 0 | 20 μm | 20 μm | 1.26 |
| 1200 lpi/21.15 μm | 2 μm | 0 | 20 μm | 20 μm | 1.06 | utilizing timing marks 352 on drum 12. Arrangement 350 includes processing which enables determination of the existence and extent of rotational error, and generation of a control signal in response to the determination of the extent of error which is transmitted to control apparatus/decision circuit 354 controlling the switching unit 70 which directs the input data signal from a laser driver 380 to one emitting element in the laser array 50.

In the case of control from stored data, the spot position correction is predetermined. This method is feasible for certain recurrent errors such as off axis rotation of a photoreceptive drum, surface distortion of a display screen, etc. The predetermined correction is applied to the control apparatus/decision circuit 354 controlling the selection of the laser to be activated for the scan from a processor controlled memory device 356 or the like. The output of the processor controlled memory device 356 would be synchronized by a strobe and sensor apparatus 350, or other suitable synchronization arrangement, and may or may not be used in conjunction with a real-time error determining package such as that described in the preceding paragraph.

Figure 11:
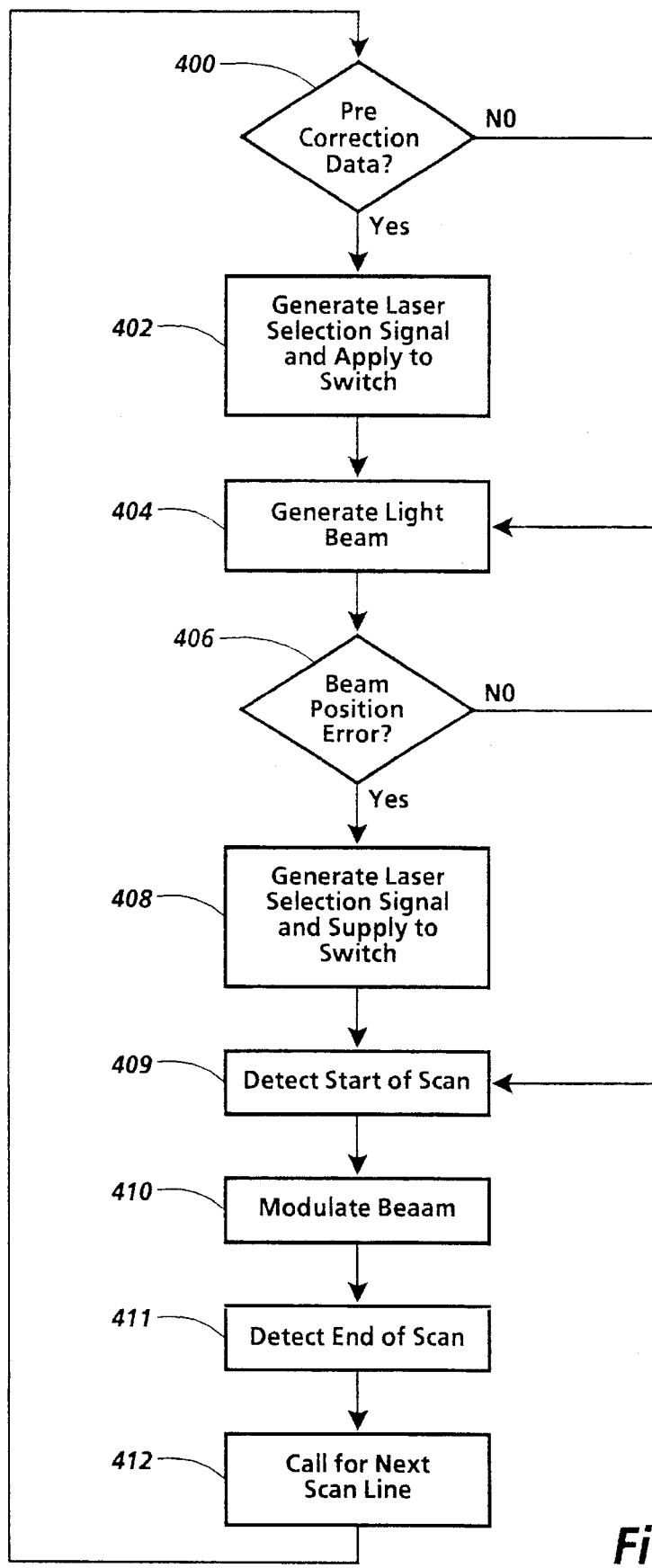
FIG. 11 is a flow diagram of one embodiment of the present invention for determining and correcting for slow scan direction errors on the fly, and for compensating for predetermined slow scan direction spot position errors.

FIG. 11 details one complete cycle of operation of the method of the present invention for correcting for slow scan direction errors. It will be assumed that any predetermination of required correction for recurrent errors has been made, and that the correction data has been stored in an appropriate memory device (such as element 356 shown in FIG. 10). To begin, means (not shown) are employed to determine whether the current scan line is one for which predetermined correction data has been stored. This is shown at step 400. If such data exists, the data is converted into a laser selection signal which is applied to the switching unit 70 (shown in FIG. 3) in order to apply bias current to one laser from the laser array, as shown at step 402. Once this preliminary correction for predetermined errors has been made, or if no such predetermined error data exists, the light beam is generated at step 404. Next, the position that the beam is incident on the image plane is determined at step 406. If there is slow scan direction position error at this point, the extent of that error is determined by appropriate determining apparatus, for example by the aforementioned strobe and sensor arrangement 350 (shown in FIG. 10). The extent of that error is converted to an appropriate electrical selection signal which is communicated to the switching unit at step 408 in order to correct for the determined error "on the fly" by selecting a different laser from the array. Once the correction for this error has been made, or if it is determined that no such error exists, the beam may then be scanned and the start of scan is detected at step 409. For arrays that are inclined to the fast-scan direction, it is important that the start of scan is detected after the laser has been finally selected from the array in order to maintain accurate timing of the modulation. After the detection of the start of scan, the beam is modulated in order to write the scan line at step 410. When the end of scan is detected, at step 411, a call is made for the next scan line data at step 412, the scan processes in the slow scan direction and the process begins again at 400.

By incorporating the above described spot position control methodology and appropriate apparatus with the appropriate apparatus for xerographic printing, including, for example, a photoreceptor belt or drum, means for moving the photoreceptor, means for charging the photoreceptor, means for forming a latent image on the photoreceptor, means for transferring the latent image to paper, means for erasing the latent image from the photoreceptor and for cleaning the photoreceptor, paper transport means, and means for fusing the image onto the paper, a complete xerographic print engine (not shown) may be produced. Details of the structure and operation of printer devices in general are beyond the scope of the present disclosure, however they are well known to those skilled in the art. It will be appreciated from the above description, though, that the present invention is particularly well suited for inclusion in those printing applications employing ROS as a portion of the printing process, as well as other printing applications.

In general, to those skilled in the art to which this invention relates, many changes in construction and widely differing embodiments and applications of the present invention will suggest themselves without departing from its spirit and scope. Thus, the disclosures and descriptions herein are illustrative, and are not intended to be in any sense limiting.

What is claimed is:

1. An apparatus for scanning a light beam, in a scan line direction, across an imaging medium movable in a slow scan direction orthogonal to said scan line direction, and for providing image spot position control within the inter-scan line distance between successive scan lines, comprising:

a linear array of independently addressable, single light emitting elements including first and last light emitting elements, wherein each of said of light emitting elements may form an image spot, having a continuous illumination profile, on said imaging medium, said first and last light emitting elements being spaced from one another by a distance which will cause centers of the image spots formed by the first and last light emitting elements to be separated by said inter-scan line distance;

a controller in communication with said plurality of light emitting elements for selecting a single light emitting element of said linear array;

scanner means for moving an image spot, emanating from said selected single light emitting element, across said imaging medium to form a scan line; and a position detector, in communication with said controller, for detecting the position of said imaging medium in said slow scan direction, and generating a control signal as a function thereof, whereby said controller selects one of said light emitting elements in response to said control signal.

2. The apparatus according to claim 1, wherein said position detector further compares the detected position of the imaging medium with a desired position of the imaging medium to generate the control signal.

3. The apparatus according to claim 1, wherein a full width at half maximum of an intensity profile of the image spot formed on the image plane is equal to the predetermined scan distance interval in the slow scan direction.

4. The apparatus according to claim 1, wherein said plurality of independently addressable light emitting elements comprises a monolithically formed array of solid state lasers.

5. The apparatus according to claim 4, wherein said monolithically formed array of solid state lasers comprises surface emitting solid state lasers.

6. The apparatus according to claim 1, wherein adjacent ones of said plurality of linearly aligned light emitting elements are spaced from one another by a substantially equal distance.

7. The apparatus according to claim 1, wherein said position detector comprises a memory for storing correction data for correcting recurrent errors in the slow scan direction.

8. The apparatus according to claim 1, wherein the image medium comprises a photoreceptor.

9. The apparatus according to claim 1 wherein said first emitting element is located so that the center of the image spot formed thereby is positioned midway between two adjacent scan lines.

10. An apparatus for scanning a light beam, in a scan line direction, across an imaging medium movable in a slow scan direction orthogonal to said scan line direction, and for providing image spot position control within the interscan line distance between successive scan lines, comprising:

- a linear array of independently addressable, single light emitting elements including first and last light emitting elements, wherein each of said light emitting elements may form an image spot, having a continuous illumination profile, on said imaging medium, said first and last light emitting elements being spaced from one another by a distance which will cause the centers of the image spots formed by the first and last light emitting elements to be separated by said inter-scan line distance;

- a controller in communication with said plurality of light emitting elements for selecting a single light emitting element of said linear array;

- scanner means for moving an image spot, emanating from said selected single light emitting element, across said imaging medium to form a scan line; and

- a position detector, in communication with said controller means, for detecting the position of said image spot in said slow scan direction, and generating a control signal as a function thereof, whereby said controller selects one of said light emitting elements in response to said control signal.

* * * * *